US 10,858,221 B2

(12) United States Patent
Turek et al.

(10) Patent No.: US 10,858,221 B2
(45) Date of Patent: Dec. 8, 2020

(54) PEOPLE CONVEYOR DRIVE AND PEOPLE CONVEYOR

(71) Applicant: Otis Elevator Company, Farmington, CT (US)

(72) Inventors: Alexander Turek, Münchendorf (AT); Thomas Illedits, Neufeld an der Leitha (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/718,643

(22) Filed: Dec. 18, 2019

(65) Prior Publication Data
US 2020/0198934 A1 Jun. 25, 2020

(30) Foreign Application Priority Data

Dec. 19, 2018 (EP) .................................... 18213963

(51) Int. Cl.
*B66B 23/02* (2006.01)
*B66B 23/04* (2006.01)
(Continued)

(52) U.S. Cl.
CPC .............. *B66B 23/02* (2013.01); *B65G 23/04* (2013.01); *B65G 23/22* (2013.01); *B66B 21/04* (2013.01);
(Continued)

(58) Field of Classification Search
CPC ......... B66B 23/02; B66B 23/04; B66B 23/22; B66B 21/04; B66B 21/10; F16H 7/02; F16H 7/023
(Continued)

(56) References Cited

U.S. PATENT DOCUMENTS 2,930,478 A 3/1960 Ruffino
5,224,580 A 7/1993 Nurnberg et al.
(Continued)

FOREIGN PATENT DOCUMENTS

CN 103434261 B 6/2015
DE 2557909 A1 6/1977
(Continued)

OTHER PUBLICATIONS

European Search Report for application EP 18213963.4, dated Jul. 5, 2019, 7 pages.
(Continued)

*Primary Examiner* — Douglas A Hess
(74) *Attorney, Agent, or Firm* — Cantor Colburn LLP

(57) ABSTRACT

The invention relates to a people conveyor drive (40) of a people conveyor (1) comprising a plurality of treads (13) interconnected to form an endless tread band (12). The people conveyor drive (40) comprises a tension member drive system (25) configured for driving the endless tread band (12), and a shaft (50) having a shaft main portion (52) and at least one shaft support portion (54). The at least one shaft support portion (54) is supported by at least one shaft bearing (57) to be rotatable around a shaft axis (A). The shaft (50) is configured for engaging with an endless tread drive tension member (15). The shaft (50) has a split shaft configuration in which the shaft main portion (52) is detachably coupled to the at least one shaft support portion (54).

15 Claims, 6 Drawing Sheets

(51) Int. Cl.
  *B66B 23/22* (2006.01)
  *B66B 21/04* (2006.01)
  *B66B 21/10* (2006.01)
  *B65G 23/04* (2006.01)
  *B65G 23/22* (2006.01)
  *F16H 7/02* (2006.01)

(52) U.S. Cl.
  CPC ............... *B66B 21/10* (2013.01); *F16H 7/02* (2013.01); *F16H 7/023* (2013.01); *B65G 2207/40* (2013.01)

(58) Field of Classification Search
  USPC .......................................... 198/326, 327, 330
  See application file for complete search history.

(56) References Cited

U.S. PATENT DOCUMENTS

| | | | | |
|---|---|---|---|---|
| 5,322,478 | A * | 6/1994 | Bos | B65G 23/06 474/95 |
| 5,348,131 | A * | 9/1994 | Yamaguchi | B66B 23/026 198/330 |
| 6,086,495 | A * | 7/2000 | Stebnicki | F16H 55/12 474/152 |
| 6,758,776 | B2 * | 7/2004 | Fye | F16H 55/30 474/95 |
| 6,974,018 | B2 * | 12/2005 | Lunardi | B66B 23/04 198/330 |
| 7,597,182 | B2 * | 10/2009 | Illedits | B66B 23/026 198/330 |
| 7,681,710 | B2 | 3/2010 | Kuhn et al. | |
| 7,731,009 | B2 | 6/2010 | Aulanko et al. | |
| 7,762,381 | B2 | 7/2010 | Mustalahti et al. | |
| 7,954,619 | B2 * | 6/2011 | Nurnberg | B66B 23/04 198/330 |
| 8,267,818 | B2 * | 9/2012 | Curley | F16H 55/12 474/152 |
| 8,322,519 | B2 | 12/2012 | Kuhn et al. | |
| 8,381,894 | B2 * | 2/2013 | Nurnberg | B66B 23/026 198/330 |
| 8,464,863 | B2 | 6/2013 | Pierret et al. | |
| 9,637,351 | B2 * | 5/2017 | Dai | B66B 23/026 |
| 9,751,697 | B2 | 9/2017 | Ma | |
| 10,065,839 | B2 * | 9/2018 | Park | B66B 21/02 |
| 10,309,514 | B2 * | 6/2019 | Crump | F16H 55/30 |
| 2006/0006046 | A1 * | 1/2006 | Berger et al. | |
| 2008/0067034 | A1 | 3/2008 | Illedits et al. | |
| 2012/0090159 | A1 | 4/2012 | Hahn | |

FOREIGN PATENT DOCUMENTS

| | | | | |
|---|---|---|---|---|
| EP | 1020394 | A1 | 7/2000 | |
| EP | 2397424 | A1 | 12/2011 | |
| EP | 3569555 | A1 * | 11/2019 | ............ B66B 23/02 |
| JP | H0558428 | A | 3/1993 | |
| JP | H0664719 | B2 | 8/1994 | |
| JP | 2008081216 | A | 4/2008 | |

OTHER PUBLICATIONS

SuperMax Tools, "Owner's Manual for Supermax 25 and Supermax 37 (Single Drum); Supermax 25x2 and Supermax 37x2 (Dual Drum)", available at: https://www.supermaxtools.com/wp-content/uploads/Double-Drum-Sander-25x2-37x2-Owners-Manual-10-2015.pdf, accessed Dec. 16, 2019, 48 pages.

* cited by examiner

PEOPLE CONVEYOR DRIVE AND PEOPLE CONVEYOR

FOREIGN PRIORITY

This application claims priority to European Patent Application No. 18213963.4, filed Dec. 19, 2018, and all the benefits accruing therefrom under 35 U.S.C. § 119, the contents of which in its entirety are herein incorporated by reference.

BACKGROUND

The invention relates to a people conveyor drive. The invention further relates to a people conveyor comprising such people conveyor drive.

People conveyors, such as escalators, moving walkways, moving sidewalks, etc. are widely used these days to effectively transport passengers from one location to another. Areas of usage of these people conveyors may include airports, hotels, shopping malls, museums, railway stations and other public buildings. Such people conveyors typically have two landings (e.g., a top landing and a bottom landing in case of an escalator) and a plurality of treads, such as steps or pallets, interconnected to form an endless tread band extending in a longitudinal conveyance direction. The endless tread band is driven by a tension member drive system comprising an endless tread drive tension member, e.g. a tread drive belt or a tread drive chain.

It would be beneficial to reduce maintenance time, maintenance costs and downtimes of such a people conveyor.

SUMMARY

An exemplary embodiment of the invention relates to a people conveyor drive of a people conveyor comprising a plurality of treads interconnected to form an endless tread band. The people conveyor drive comprises a tension member drive system configured for driving the tread band, and a shaft having a shaft main portion and at least one shaft support portion, the at least one shaft support portion being supported by at least one shaft bearing to be rotatable around a shaft axis. The shaft is configured for engaging with an endless tread drive tension member, in particular for driving the endless tread band. The shaft has a split shaft configuration with the shaft main portion being detachably coupled to the at least one shaft support portion. A further exemplary embodiment relates to a people conveyor comprising the people conveyor drive according to any of the exemplary embodiments described herein, and a plurality of treads interconnected to form an endless tread band driven by the people conveyor drive.

The people conveyor may be an escalator comprising a plurality of steps forming the endless tread band. The people conveyor may be a moving walkway comprising a plurality of pallets forming the endless tread band. The moving walkway may be a horizontally extending walkway or an inclined walkway.

A people conveyor drive and a method of removing the shaft main portion from a people conveyor drive according to exemplary embodiments of the invention allow removing the shaft main portion of the people conveyor drive without removing the at least one shaft support portion. It further allows installing the endless tread drive tension member in its endless configuration, i.e. without disconnecting the endless tread drive tension member to open its endless configuration. As a result, the time and costs for replacing the endless tread drive tension member may be reduced.

A number of optional features are set out in the following. These features may be realized in particular embodiments, alone or in combination with any of the other features.

The shaft may be provided with at least one drive wheel configured for engaging with the endless tread drive tension member. The at least one drive wheel in particular may comprise an inner drive wheel portion mounted to, or formed integrally with, the shaft main portion, and an outer drive wheel portion mounted to, or formed integrally with, the at least one shaft support portion, with the inner drive wheel portion being detachably fixable to the outer drive wheel portion for coupling the shaft main portion to the at least one shaft support portion.

Such a configuration allows detachably coupling the shaft main portion to the at least one shaft support portion without increasing the diameter of any of the shaft portions. This allows providing a space-saving split shaft configuration, which in particular does not occupy more space than a conventional (non-split) shaft configuration.

The shaft main portion and the at least one shaft support portion may have the same diameter, and/or the inner drive wheel portion and the at least one outer drive wheel portion may have the same diameter.

The people conveyor drive may further at least one fixing element, for example a bolt or a screw, configured for detachably fixing the inner drive wheel portion to the outer drive wheel portion. The at least one fixing element may be configured for extending simultaneously through the inner and outer drive wheel portions. The at least one fixing element in particular may be configured to extend parallel to the shaft axis.

The at least one fixing element allows for establishing a secure connection between the inner drive wheel portion and the outer drive wheel portion which may be disconnected easily for detaching the shaft main portion.

At least one of the inner and outer drive wheel portions may be formed integrally with the corresponding shaft portion to create a mechanically strong and reliable connection between the respective drive wheel portion and the corresponding shaft portion. At least one of the inner and outer drive wheel portions may be welded to the corresponding shaft portion.

At least one of the inner and outer drive wheel portions may be fixed to the corresponding shaft portion employing a spline structure and/or at least one parallel key extending parallel to the shaft axis for establishing a mechanically strong and detachable connection between the respective drive wheel portion and the corresponding shaft portion.

For securing a correct alignment of the adjacent ends shaft portions and for preventing the respective drive wheel portion from sliding along the corresponding shaft portion, at least one locating ring and/or at least one retaining ring may be arranged between at least one of the inner drive wheel portion and the outer drive wheel portion and the corresponding shaft portion.

The drive wheel may be one of a toothed belt drive sheave, a traction sheave, a pulley, and a sprocket. The drive wheel may be configured for engaging with a correspondingly shaped tension member, in particular a drive chain or a drive belt, in particular a toothed drive belt.

The shaft main portion may comprise a left inner drive wheel portion at a left end, and a right inner drive wheel portion at an opposing right end. The shaft may further comprise a left shaft support portion with a left outer drive wheel portion detachably coupled to the left inner drive wheel portion and a right shaft support portion with a right outer drive wheel portion detachably coupled to the right inner drive wheel portion. Such a structure allows for a symmetric configuration of the people conveyor drive resulting in symmetric drive forces acting parallel to the conveyance direction and preventing adverse shear forces acting transverse to the conveyance direction.

The shaft may be a main drive shaft configured to be driven by a motor of the tension member drive system. The shaft also may be a non-driven turnaround shaft arranged in one of the turnaround portions, and/or a tension shaft configured for adjusting tension of the endless tread drive tension member.

Exemplary embodiments also include a method of removing the shaft main portion from a people conveyor drive which is configured according to an exemplary embodiment of the invention as it has been described before. The method includes loosening the at least one fixing element; and separating the inner drive wheel portion from the at least one outer drive wheel portion.

DRAWING DESCRIPTION

In the following, exemplary embodiments of the invention are described with reference to the enclosed figures.

DETAILED DESCRIPTION

Figure 1:
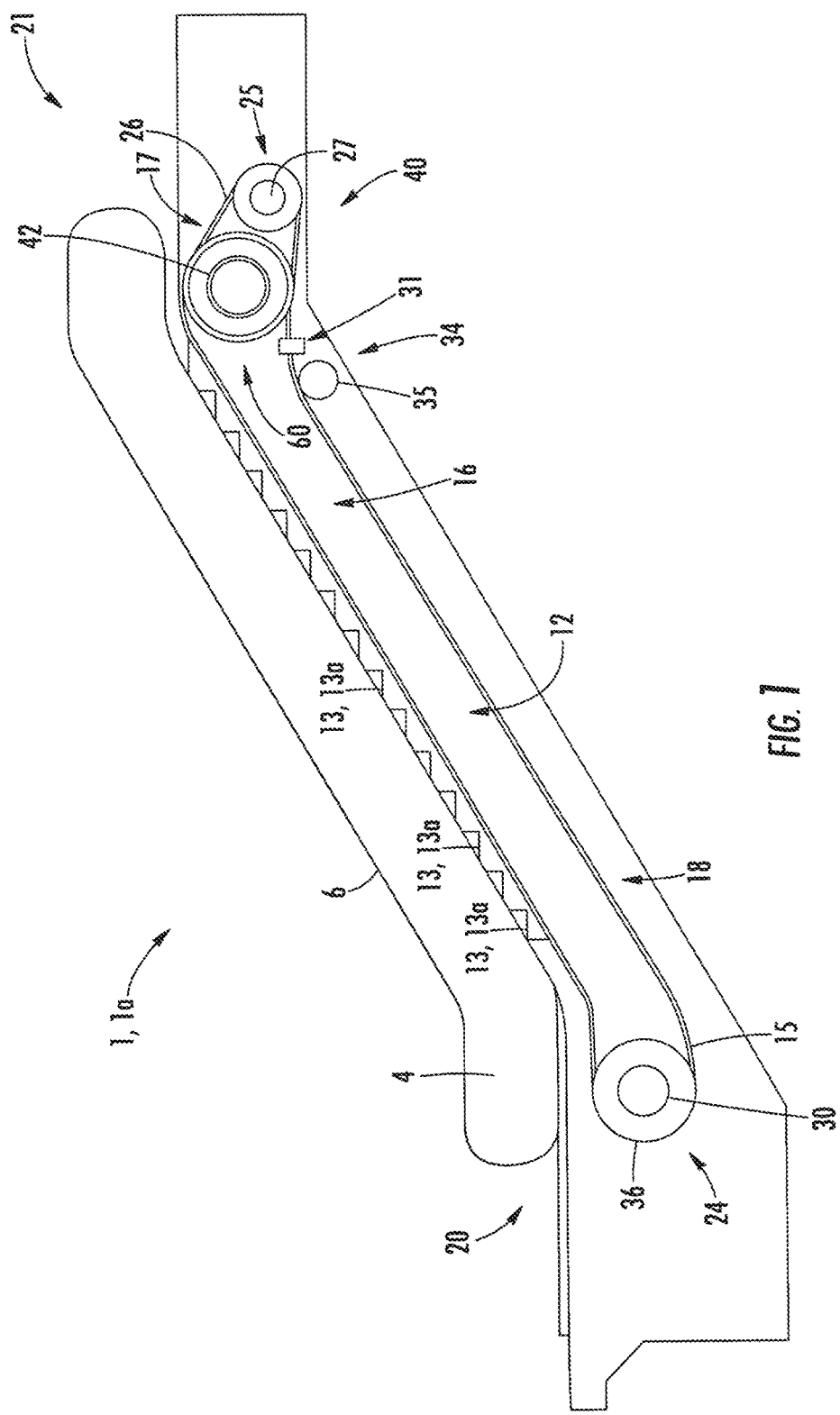
FIG. 1 depicts a schematic side view of an escalator in which a people conveyor drive according to an exemplary embodiment of the invention may be employed.

FIG. 1 shows a schematic side view of a people conveyor 1, in particular an escalator 1a, comprising a plurality of treads 13 (steps 13a) interconnected to form an endless tread band 12 extending in a longitudinal conveyance direction between a lower landing 20 and an upper landing 21. For clarity, only some of the treads 13, in particular treads 13 in the conveyance portion 16, are depicted in FIG. 1. Further, not all treads 13 are denoted with reference signs.

In an upper turnaround portion 17 next to the upper landing 21 and in a lower turnaround portion 24 next to the lower landing 20, the endless tread band 12 passes from a conveyance portion 16 extending between the upper and lower landings 21, 20 into a return portion 18, and vice versa.

The upper turnaround portion 17 is a driving portion comprising a people conveyor drive 40 including a tension member drive system 25. The tension member drive system 25 comprises a motor 27 configured for driving a drive shaft 42 via a transmission element 26, such as a toothed belt, a belt or a chain. The drive shaft 42 supports a drive wheel 60, e.g. a toothed belt drive sheave, a traction sheave or a sprocket.

The drive wheel 60 drivingly engages with an endless tread drive tension member 15. The endless tread drive tension member 15 may be a belt, particularly a toothed belt, or a chain. The endless tread drive tension member 15 is drivingly coupled to the treads 13 for driving the treads 13 to travel along the endless path of the tread band 12. The endless tread drive tension member 15 is endless and thus extends along a closed loop.

The lower turnaround portion 24 comprises a turnaround element 36, e.g. an idler wheel or an idler sprocket attached to a (non-driven) turnaround shaft 30. The turnaround element 36 engages with the endless tread drive tension member 15 to guide the endless tread drive tension member 15 from the conveyance portion 16 to the return portion 18.

In a tension portion 34 the endless tread drive tension member 15 engages a tension shaft 35 having a tension element, e.g. an idler sprocket or an idler wheel. The tension element is configured to adjust tension of the endless tread drive tension member 15 while traveling along its endless path, such that wear of the endless tread drive tension member 15 is reduced. For example, the tension portion 34 may be positioned in the return portion 18.

In further embodiments, the tension portion 34 may be located in the upper and/or lower turnaround portions 17, 24. In such case, the turnaround shaft 30 may also provide the function of the tension shaft 35.

Alternatively, the turnaround portion 24 next to the lower landing 20 may be the driving portion.

The people conveyor 1 further comprises a brake 31 which is configured for braking movement of the endless tread band 12. The brake 31 is depicted as a separate component of the tension member drive system 25 in FIG. 1. The brake 31, however, may be integrated with another component of the tension member drive system 25. For example, the brake 31 may engage with the drive wheel 60 or the drive shaft 42.

Balustrades 4 supporting moving handrails 6 extend parallel to the conveyance portion 16. Only one of the balustrades 4 is visible in the side view shown in FIG. 1.

Figure 2:
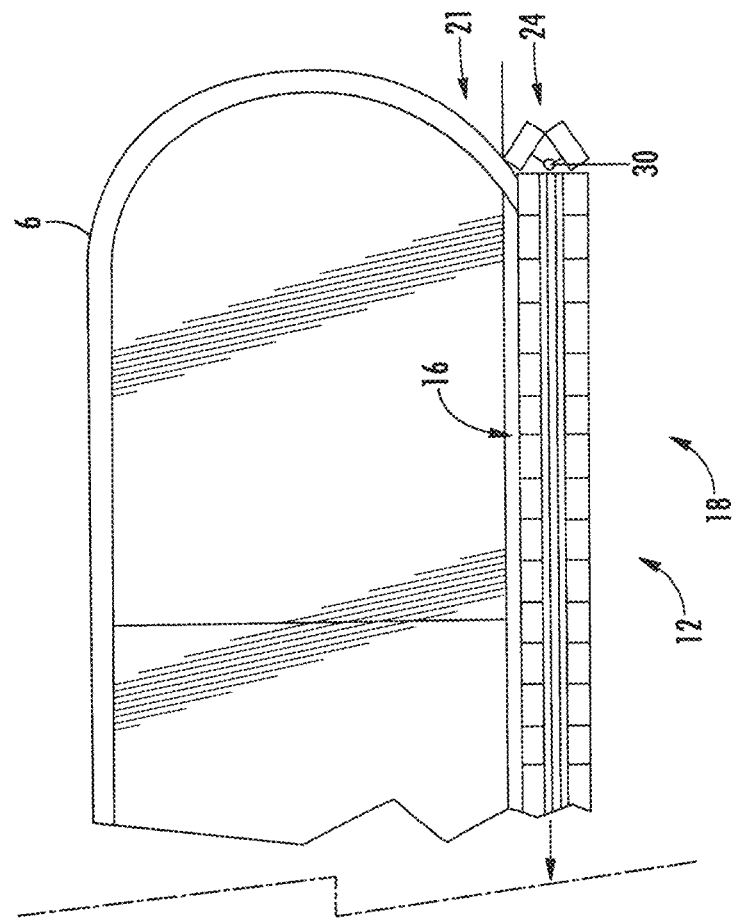
FIG. 2 depicts a schematic side view of a moving walkway in which a people conveyor drive according to an exemplary embodiment of the invention may be employed.
Figure 2:
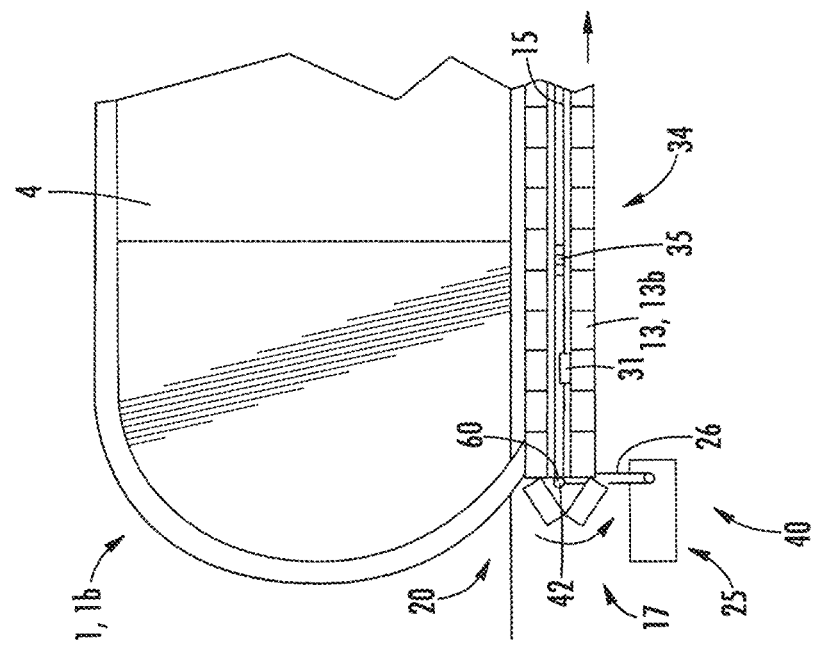

FIG. 2 depicts a schematic side view of a people conveyor 1, which is provided as a moving walkway 1b. The moving walkway 1b comprises a plurality of treads 13 (pallets 13b) interconnected to form an endless tread band 12 moving in a longitudinal conveyance direction in an upper conveyance portion 16 and moving in a return direction opposite to the conveyance direction in a lower return portion 18. For clarity not all treads 13 (pallets 13b) are provided with reference signs.

Left and right landings 20, 21 are provided at both ends of the moving walkway 1b. A left turnaround portion 17 is provided at the left landing 20, and a right turnaround portion 24 is provided at the right landing 21. In the left turnaround portion 17 next to the left landing 21 and in the right turnaround portion 24 next to the right landing 21, the endless tread band 12 passes from a conveyance portion 16 extending between the left and right landings 20, 21 into a return portion 18, and vice versa.

The left turnaround portion 17 is a driving portion comprising a people conveyor drive 40 including a tension member drive system 25. The tension member drive system 25 comprises a motor 27 driving a drive shaft 42 via a transmission element 26, particularly a toothed belt, a belt or a chain. The drive shaft 42 supports a drive wheel 60, e.g. a toothed belt drive sheave, a traction sheave or a sprocket.

The drive wheel 60 drivingly engages an endless tread drive tension member 15. The endless tread drive tension member 15 may be a belt, particularly a toothed belt, or a chain. The endless tread drive tension member 15 is drivingly coupled to the treads 13 and thereby drives the treads 13 to travel along the endless path of the tread band 12.

The right turnaround portion 24 comprises a turnaround element (not shown), e.g. an idler wheel or an idler sprocket, attached to a turnaround shaft 30. The turnaround element engages with the endless tread drive tension member 15 to guide the endless tread drive tension member 15 from the conveyance portion 16 to the return portion 18.

In a tension portion 34, the endless tread drive tension member 15 engages a tension shaft 35 having a tension element, e.g. an idler sprocket or an idler wheel. The tension element is configured to adjust the tension of the endless tread drive tension member 15 while traveling along its endless path, such that wear of the endless tread drive tension member 15 is reduced. For example, the tension portion 34 may be positioned in the return portion 18.

In further embodiments, the tension portion 34 may be located in the left and/or right turnaround portions 17, 24. In such case, the turnaround shaft 30 may also provide the function of the tension shaft 35.

Alternatively, the turnaround portion 24 next to the right landing 21 may be the driving portion.

The people conveyor 1 further comprises a brake 31 which is configured for braking movement of the endless tread band 12. The brake 31 is depicted as a separate component of the tension member drive system 25 in FIG. 2. The brake 31, however, may be integrated with another component of the tension member drive system 25. For example, the brake 31 may engage with the drive wheel 60 or the drive shaft 42.

Balustrades 4 supporting moving handrails 6 extend parallel to the conveyance portion 16. Only one of the balustrades 4 is visible in the side view depicted in FIG. 2.

Although the people conveyor 1 depicted in FIG. 2 is a horizontally extending moving walkway 1b, the skilled person understands that it also may be an inclined moving walkway 1b comprising landing portions 20, 21 arranged at different heights.

Figure 3:
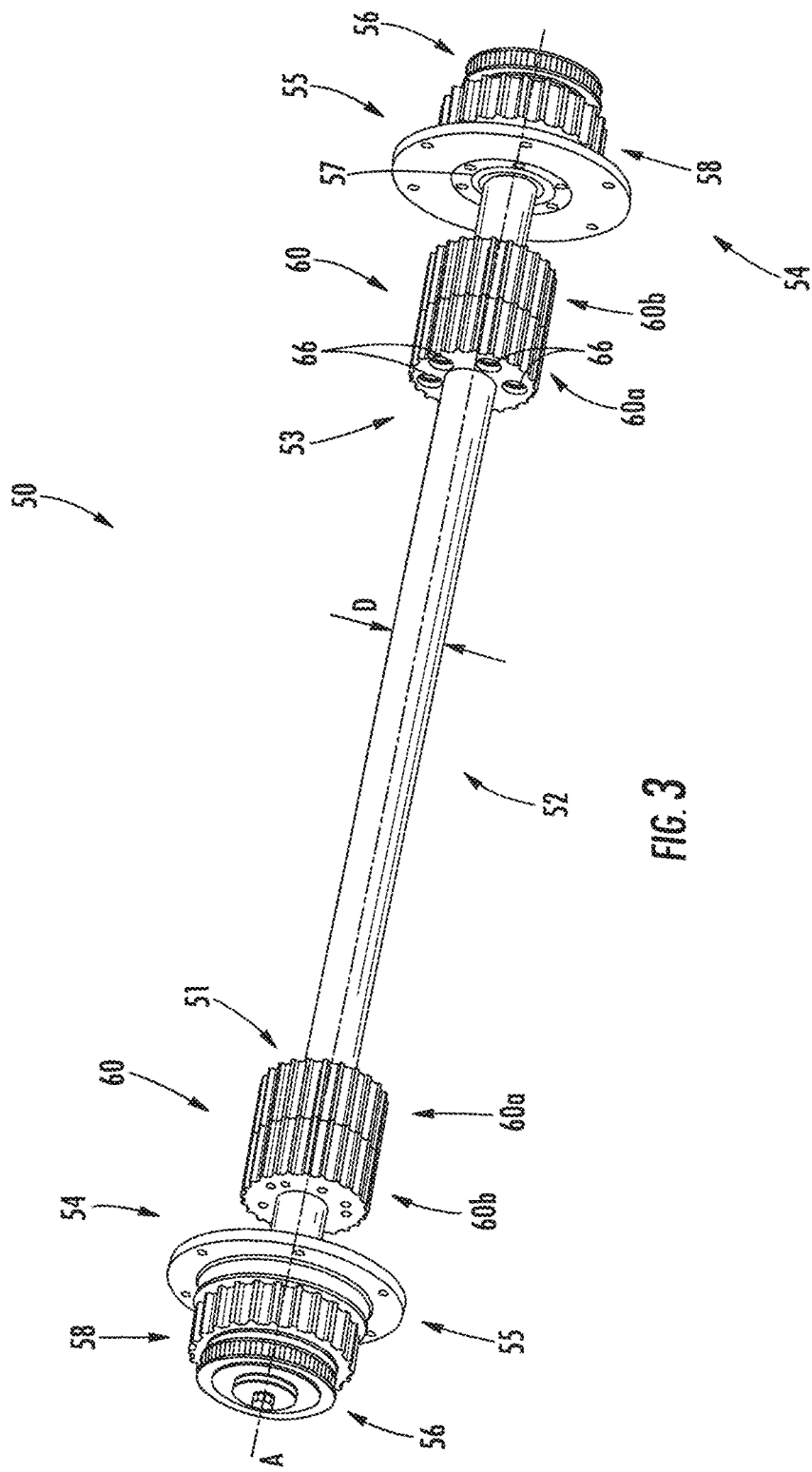
FIG. 3 depicts a perspective view of a shaft of a people conveyor drive according to an exemplary embodiment of the invention in an assembled state.

FIG. 3 depicts a perspective view of a shaft 50 of a people conveyor drive 40 according to an exemplary embodiment of the invention in an assembled state. The shaft 50 may be employed as a turnaround shaft 30, as a tension shaft 35 and/or as a drive shaft 42.

Figure 4:
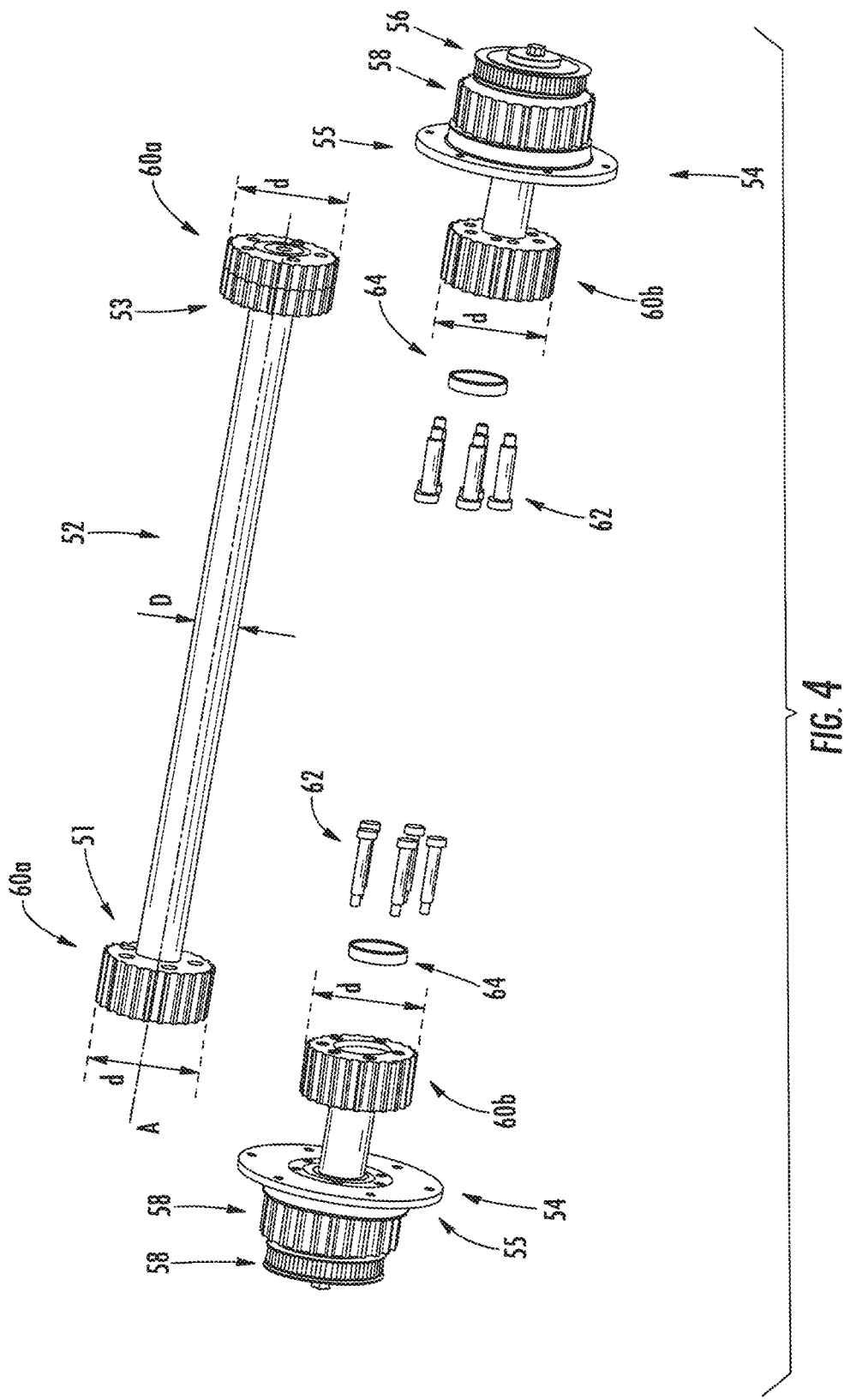
FIG. 4 depicts a perspective view of the shaft depicted in FIG. 3 in a disassembled state.
Figure 5:
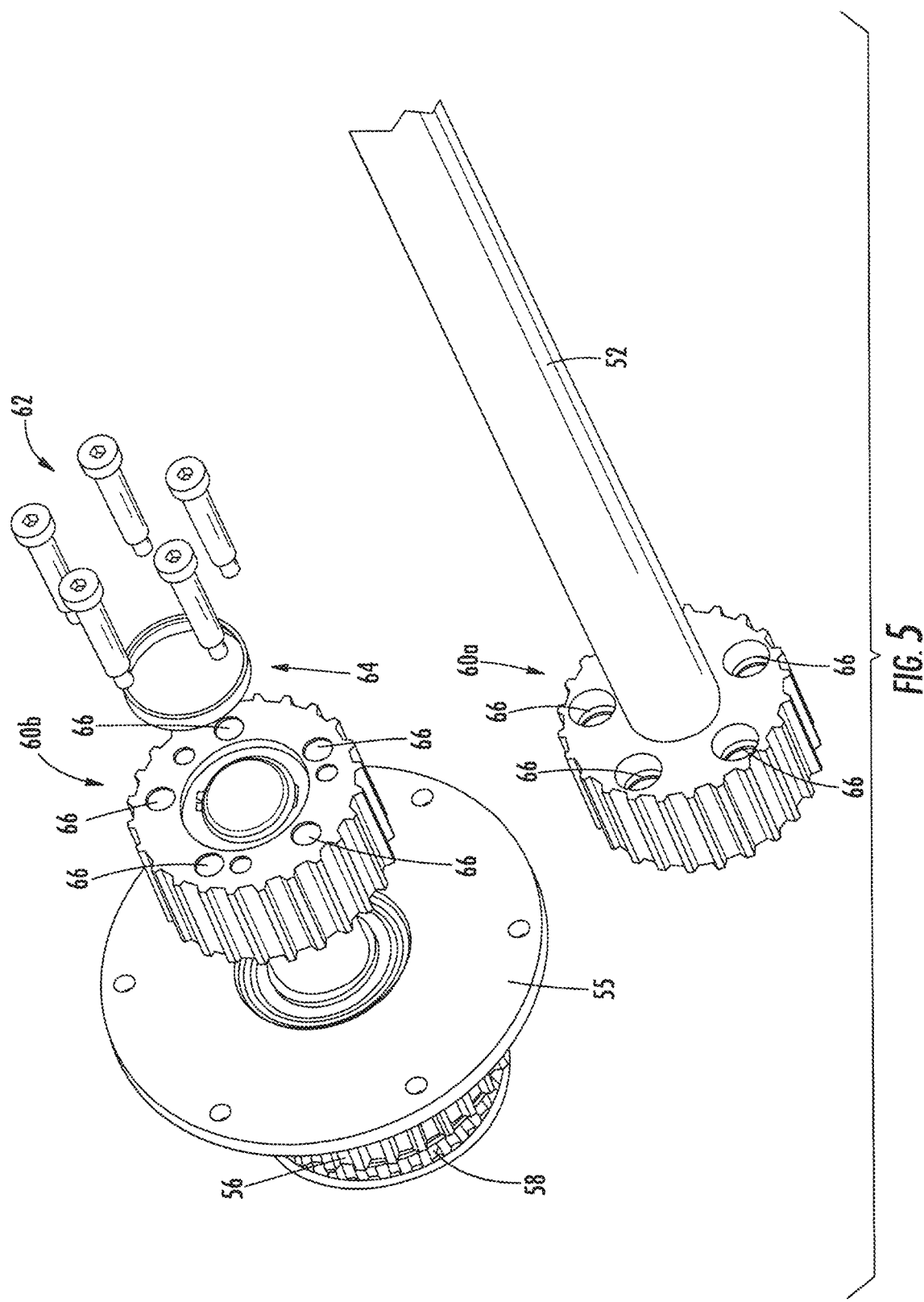
FIG. 5 depicts an enlarged perspective view of a side portion of the shaft depicted in FIGS. 3 and 4 in the disassembled state.
Figure 6:
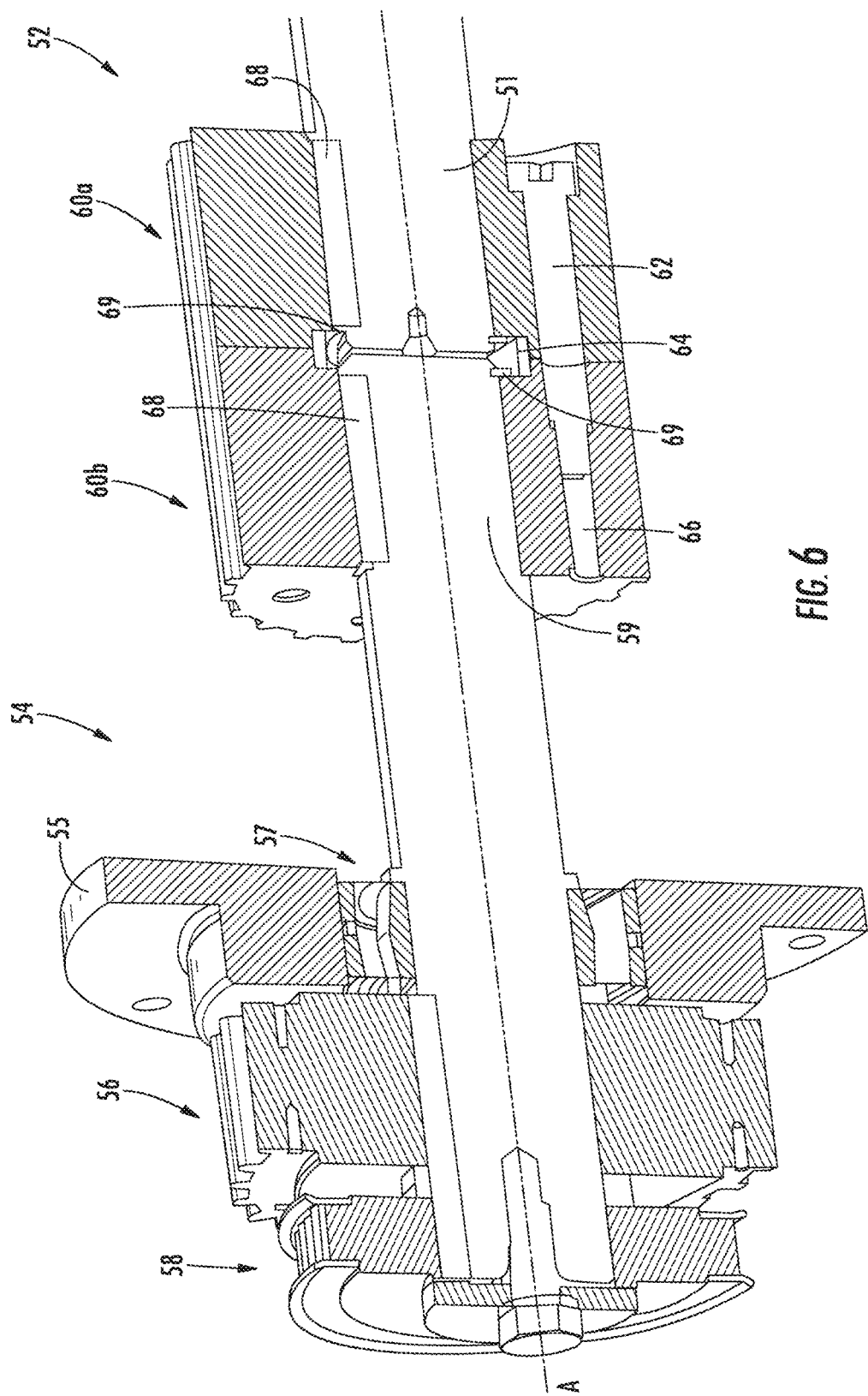
FIG. 6 depicts a sectional view of a lateral end portion of the shaft depicted in FIGS. 3 to 5 in the assembled state.

FIG. 4 depicts a perspective view of the shaft 50 in a disassembled state, FIG. 5 depicts an enlarged perspective view of a lateral end portion of the shaft 50 in a disassembled state, and FIG. 6 depicts a sectional view of an lateral end portion of the shaft 50 in the assembled state.

The shaft 50 depicted in FIGS. 3 to 6 comprises a central shaft main portion 52 extending along a shaft axis A and two shaft support portions 54 arranged next to opposite left and right ends 51, 53 of the shaft main portion 52.

Each shaft support portion 54 is rotatably supported by a support plate 55 via a shaft bearing 57. The support plates 55 are mounted to a truss (not shown) of the people conveyor 1.

Two outer sprockets or sheaves 56, 58 are mounted to each of the shaft support portions 54, respectively. The outer sprockets or sheaves 56, 58 are in particular mounted to an outer end of the respective shaft support portion 54 facing away from the central shaft main portion 52.

The outer sprockets or sheaves 56, 58 allow drivingly coupling the shaft 50 with the tension member drive system 25 and/or with a handrail drive system (not shown) configured for driving the handrail 6 (see FIGS. 1 and 2). The outer sprockets or sheaves 56, 58 are not needed and may be omitted, in particular in case the shaft 50 is used as a turnaround shaft 30 or as a tension shaft 35.

An outer drive wheel portion 60b is provided at the inner end of each of the shaft support portions 54 facing the shaft main portion 52, respectively.

A similar inner wheel portion 60a is provided at the outer end of each of the shaft main portions 52 facing the shaft support portion 54.

The inner wheel portions 60a and the outer wheel portions 60b are basically identical in shape. The inner and outer wheel portions 60a, 60b in particular have the same diameter d perpendicular to the shaft axis A (see FIG. 4). They also have the same number of teeth and same pitch. In consequence, when arranged next to each other, an outer drive wheel portion 60b and a corresponding inner drive wheel portion 60a in combination constitute a drive wheel 60 configured for engaging with the tension member 15 (not shown in FIGS. 3 to 6).

In the exemplary embodiment depicted in the figures, the inner and outer wheel portions 60a, 60b have the same extension in the axial direction, i.e. each of the inner and outer wheel portions 60a, 60b constitutes one half of the respective drive wheel 60, respectively. However, in alternative configurations, which are not shown in the figures, the inner and outer wheel portions 60a, 60b may have different dimensions in the axial direction.

The shaft main portion 52 and the shaft support portion 54 also may have the same diameter D, e.g. a diameter of 50 mm to 70 mm, in particular a diameter D of 60 mm (cf. FIGS. 3 and 4).

Openings 66 extending parallel to the shaft axis A are formed in the inner and outer wheel portions 60a, 60b. The openings 66 are configured for accommodating fixing elements 62 (see FIGS. 4 to 6) such as bolts or screws extending through adjacent inner and outer wheel portions 60a, 60b for fixing the inner and outer wheel portions 60a, 60b to each other forming a drive wheel 60, as depicted in FIGS. 3 and 6.

After releasing the fixing elements 62, the inner and outer wheel portions 60a, 60b may be separated from each other (see FIGS. 4 and 5).

Thus, the shaft main portion 50 may be removed easily from the people conveyor drive 40 by loosening the fixing elements 62 extending through the drive wheels 60 and separating the inner drive wheel portions 60a from the drive wheel portions 60b in order to separate the shaft main portion 50 from the shaft support portions 54.

As shown in FIG. 6, a locating ring 64 and corresponding retaining rings 69 may be provided at the interface between the inner and outer wheel portions 60a, 60b for securing a proper alignment of the inner and outer wheel portions 60a, 60b and the adjacent ends 51, 53, and 59 of the shafts portions 52, 54 and for preventing undesirable movements of the shafts portions 52, 54 along the shaft axis A.

The inner and outer wheel portions 60a, 60b may be formed integrally with the respective shaft portion 52, 54. The inner and outer wheel portions 60a, 60b for example may be welded to the respective shaft portion 52, 54.

The inner and outer wheel portions 60a, 60b also may be rotationally fixed to the respective shaft portion 52, 54 employing a spline structure and/or parallel feather keys 68 extending parallel to the axial direction, as depicted in FIG. 6.

This, however, is only any example, and other fixing methods known to the skilled person may be employed as well.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 people conveyor
1a escalator
1b moving walkway
4 balustrade
6 moving handrail
12 endless tread band
13 tread
13a step
13b pallet
14 roller
15 endless tread drive tension member
16 conveyance portion
17 driving portion
18 return portion
20, 21 landing portions
24 turnaround portion
25 tension member drive system
26 transmission element
27 motor
30 turnaround shaft
31 brake
34 tension portion
35 tension shaft
36 turnaround element
39 truss
40 people conveyor drive
42 drive shaft
50 shaft
51 left end of the shaft main portion
52 shaft main portion
53 right end of the shaft main portion
54 shaft support portion
55 support plate
56 outer sprocket or sheave
57 shaft bearing
58 outer sprocket or sheave
59 end of the shaft support portion
60 drive wheel
60a inner wheel portion
60b outer wheel portion
62 fixing element
64 locating ring
66 opening
68 feather key
69 retaining ring
A shaft axis
d diameter of the drive wheels
D diameter of the shaft portions

What is claimed is:

1. People conveyor drive of a people conveyor comprising a plurality of treads interconnected to form an endless tread band, the people conveyor drive comprising:
a tension member drive system configured for driving the endless tread band; and
a shaft having a shaft main portion and at least one shaft support portion, the at least one shaft support portion being supported by at least one shaft bearing to be rotatable around a shaft axis;
wherein the shaft is configured for engaging with an endless tread drive tension member; and
wherein the shaft has a split shaft configuration with the shaft main portion being detachably coupled to the at least one shaft support portion;
wherein the shaft is provided with at least one drive wheel configured for engaging with the endless drive tension member, the at least one drive wheel comprising an inner drive wheel portion mounted to, or formed integrally with, the shaft main portion, and an outer drive wheel portion mounted to, or formed integrally with, the at least one shaft support portion;
wherein the inner drive wheel portion is detachably fixable to the outer drive wheel portion for coupling the shaft main portion to the at least one shaft support portion.

2. People conveyor drive according to claim 1, comprising at least one fixing element configured for detachably fixing the inner drive wheel portion to the outer drive wheel portion.

3. Method of removing the shaft main portion from a people conveyor drive according to claim 2, wherein the method includes:
loosening the at least one fixing element; and
separating the inner drive wheel portion from the at least one outer drive wheel portion.

4. People conveyor drive according to claim 2, wherein the at least one fixing element is configured to extend simultaneously through the inner and outer drive wheel portions, wherein the at least one fixing element in particular is configured to extend parallel to the shaft axis.

5. People conveyor drive according to claim 4, wherein the at least one fixing element is configured to extend parallel to the shaft axis (A).

6. People conveyor drive according to claim 1, wherein at least one of the inner and outer drive wheel portions (60a, 60b) is welded to the corresponding shaft portion.

7. People conveyor drive according to claim 1, wherein the shaft main portion and the at least one shaft support portion have the same diameter (D), and/or wherein the inner drive wheel portion and the at least one outer drive wheel portion have the same diameter (d).

8. People conveyor drive according to claim 1, wherein the drive wheel in particular is one of a toothed belt drive sheave, a traction sheave, a pulley, and a sprocket.

9. People conveyor drive according to any claim 1, wherein the shaft main portion comprises a left inner drive wheel portion at a left end, and a right inner drive wheel portion at an opposing right end, the shaft further comprising a left shaft support portion with a left outer drive wheel portion detachably coupled to the left inner drive wheel portion and a right shaft support portion with a right outer drive wheel portion detachably coupled to the right inner drive wheel portion.

10. People conveyor drive according to claim 1, wherein the shaft is a main drive shaft driven by a motor of the tension member drive system, and
wherein the endless drive tension member (15) is a chain or a belt.

11. People conveyor drive according to claim 10, wherein the belt comprises a toothed belt.

12. People conveyor drive according to claim 1, wherein the shaft is a drive shaft, a non-driven turnaround shaft, and/or a tension shaft.

13. People conveyor comprising:
the people conveyor drive according to claim 1; and
a plurality of treads interconnected to form an endless tread band driven by the people conveyor drive.

14. People conveyor drive of a people conveyor comprising a plurality of treads interconnected to form an endless tread band, the people conveyor drive comprising:
a tension member drive system configured for driving the endless tread band; and
a shaft having a shaft main portion and at least one shaft support portion, the at least one shaft support portion being supported by at least one shaft bearing to be rotatable around a shaft axis (A);
wherein the shaft is configured for engaging with an endless tread drive tension member; and
wherein the shaft has a split shaft configuration with the shaft main portion being detachably coupled to the at least one shaft support portion;
wherein at least one of the inner and outer drive wheel portions is fixed to the corresponding shaft portion employing a spline structure and/or at least one parallel key extending parallel to the shaft axis (A).

15. People conveyor drive of a people conveyor comprising a plurality of treads interconnected to form an endless tread band, the people conveyor drive comprising:
a tension member drive system configured for driving the endless tread band; and
a shaft having a shaft main portion and at least one shaft support portion, the at least one shaft support portion being supported by at least one shaft bearing to be rotatable around a shaft axis (A);
wherein the shaft is configured for engaging with an endless tread drive tension member; and
wherein the shaft has a split shaft configuration with the shaft main portion being detachably coupled to the at least one shaft support portion;
comprising at least one locating ring and/or at least one retaining ring arranged between at least one of the inner drive wheel portion and the outer drive wheel portion (60b) and the corresponding shaft portion and configured for preventing the respective drive wheel portion from sliding along the corresponding shaft portion.

* * * * *